US010447146B2

United States Patent
Auer et al.

(10) Patent No.: US 10,447,146 B2
(45) Date of Patent: Oct. 15, 2019

(54) METHOD FOR CONTROLLING A POWER FACTOR CORRECTION CIRCUIT, POWER FACTOR CORRECTION CIRCUIT AND OPERATING DEVICE FOR AN ILLUMINANT

(71) Applicant: TRIDONIC GMBH & CO KG, Dornbirn (AT)

(72) Inventors: Hans Auer, Dornbirn (AT); Peter Lampert, Feldkirch (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 45 days.

(21) Appl. No.: 14/391,285

(22) PCT Filed: Apr. 15, 2013

(86) PCT No.: PCT/AT2013/000070
§ 371 (c)(1),
(2) Date: Oct. 8, 2014

(87) PCT Pub. No.: WO2013/152372
PCT Pub. Date: Oct. 17, 2013

(65) Prior Publication Data
US 2015/0054421 A1    Feb. 26, 2015

(30) Foreign Application Priority Data

Apr. 13, 2012 (DE) .................. 10 2012 007 479

(51) Int. Cl.
*H02M 1/42* (2007.01)
*H02M 1/32* (2007.01)
(Continued)

(52) U.S. Cl.
CPC ........... *H02M 1/4241* (2013.01); *H02M 1/32* (2013.01); *H02M 1/4225* (2013.01); *H02M 7/06* (2013.01);
(Continued)

(58) Field of Classification Search
CPC ................ H02M 1/4225; H02M 1/32; H02M 2001/0032
See application file for complete search history.

(56) References Cited

U.S. PATENT DOCUMENTS 5,619,405 A    4/1997   Kammiller et al.
6,043,633 A *   3/2000   Lev et al. ..................... 323/222
(Continued)

FOREIGN PATENT DOCUMENTS

DE        10355670 A1    7/2005
DE   102004025597 A1   12/2005
(Continued)

OTHER PUBLICATIONS

English Translation of DE102009047984; Maret Guenter;Apr. 7, 2011.*

*Primary Examiner* — Yusef A Ahmed
*Assistant Examiner* — Ishrat F Jamali
(74) *Attorney, Agent, or Firm* — Volpe and Koenig, P.C.

(57) ABSTRACT

For the purpose of power factor correction, an inductance (21) is supplied with an input voltage (Vin), wherein a controllable switching means (24) that is coupled to the inductance (21) is actuated in order to selectively charge and discharge the inductance (21). A control device (14) for actuating the switching means (24) is designed such that it actuates the switching means (24) selectively on the basis of one of a plurality of modes of operation. In a first mode of operation, a switch-on time is stipulated for the switching means (24) on the basis of a minimum waiting time and on the basis of a voltage that drops across the switching means (24).

20 Claims, 6 Drawing Sheets

(51) Int. Cl.

| | | |
|---|---|---|
| *H05B 33/08* | (2006.01) | |
| *H05B 41/28* | (2006.01) | |
| *H02M 7/06* | (2006.01) | |
| *H05B 37/02* | (2006.01) | |
| *H02M 1/00* | (2006.01) | |

(52) U.S. Cl.
CPC ......... *H05B 33/0809* (2013.01); *H05B 37/02* (2013.01); *H05B 41/28* (2013.01); *H02M 2001/0032* (2013.01); *Y02B 70/126* (2013.01)

(56) References Cited

U.S. PATENT DOCUMENTS

| | | | |
|---|---|---|---|
| 7,031,173 B2* | 4/2006 | Feldtkeller | H02M 1/4225 323/222 |
| 2004/0263140 A1* | 12/2004 | Adragna et al. | 323/282 |
| 2008/0272748 A1* | 11/2008 | Melanson | 323/207 |
| 2009/0091957 A1* | 4/2009 | Orr et al. | 363/79 |
| 2011/0110132 A1 | 5/2011 | Rausch et al. | |
| 2012/0014148 A1 | 1/2012 | Li et al. | |
| 2012/0112665 A1* | 5/2012 | Melanson et al. | 315/294 |
| 2012/0133285 A1 | 5/2012 | Kelly | |
| 2012/0139435 A1 | 6/2012 | Storm | |
| 2013/0033240 A1* | 2/2013 | Ye | H02M 1/4225 323/211 |

FOREIGN PATENT DOCUMENTS

| | | |
|---|---|---|
| DE | 102008027029 A1 | 12/2009 |
| DE | 102009047984 A1 | 4/2011 |
| WO | 2011009717 A2 | 1/2011 |
| WO | 2011018324 A1 | 2/2011 |

* cited by examiner

METHOD FOR CONTROLLING A POWER FACTOR CORRECTION CIRCUIT, POWER FACTOR CORRECTION CIRCUIT AND OPERATING DEVICE FOR AN ILLUMINANT

FIELD OF THE INVENTION

The invention relates to a method and a circuit for power factor correction. In particular, the invention relates to the technical field of power factor correction for use in operating devices or electronic ballasts for illuminants.

BACKGROUND

Power factor correction (PFC), is used to eliminate or at least to reduce harmonic currents in an input current. Harmonic currents can occur particularly in the case of nonlinear loads, such as, for example, rectifiers with subsequent smoothing in power supply units, since in the case of such loads, despite the sinusoidal input voltage, the input current is phase-shifted and distorted non-sinusoidally. The higher-frequency harmonics that occur in this case can be counteracted by an active or clocked power factor correction circuit connected upstream of the respective device.

Power factor correction circuits are also used in operating devices for illuminants, for example in electronic ballasts for fluorescent illuminants or in LED converters. The use of such circuits in devices for operating illuminants is expedient since standards restrict the permissible return of harmonics into the supply system.

A circuit topology based on a boost converter, also referred to as step-up converter or up-converter, is often used for power factor correction circuits. In this case, an inductance or coil supplied with a rectified AC voltage is charged with an input current or discharged by a controllable switch being switched on or being switched off. The discharge current of the inductance flows via a diode to the output of the converter, said output being coupled to an output capacitance, such that a DC voltage increased relative to the input voltage can be tapped off at the output. Other types of converter can likewise be used.

Power factor correction circuits can be operated in different operating modes. In particular, operation with a continuous current through the abovementioned inductance (so-called "Continuous Conduction Mode", CCM), operation with a discontinuous inductance current or coil current ("Discontinuous Conduction Mode", DCM) or operation in the borderline or boundary range between continuous and discontinuous current through the inductance ("Borderline Conduction Mode" or "Boundary Conduction Mode", BCM) is known. In BCM operation a decrease in the coil current to zero during the discharge phase of the coil can be taken as a reason to start a new switching cycle and to switch the switch on again in order to charge the coil anew. The power factor correction circuit can be controlled or regulated by means of the time duration during which the switch is switched on in each case. In DCM operation, by contrast, after a zero crossing of the coil current during the discharge phase firstly there is a wait during a predefined additional waiting time until the switch is closed anew.

DE 10 2004 025 597 A1 describes a power factor correction circuit in which an output DC voltage is derived during the switched-off time duration of the switch.

When a power factor correction circuit is operated in the DCM mode, the waiting time before renewed switching-on of the converter can be chosen depending on a load, i.e. depending on an output power of the power factor correction circuit, in order to maintain a predefined bus voltage. If the switch is switched on again directly after this time has elapsed, this can lead to irregularities in the coil current. If the switch-on instant is chosen depending only on the predefined waiting time and independently of the behavior of the power factor correction circuit, an increased dissipation and thus heating of the switching means can also occur.

It is an object to specify methods and devices which offer improvements with regard to the problems mentioned. It is an object to specify methods and devices for power factor correction in which operation over a larger range of loads is possible. It is also an object to specify methods and devices in which the dynamic behavior of the power factor correction circuit during the period in which the switch is in the off state can be taken into account when determining the switch-on instant.

SUMMARY

A method, a power factor correction circuit and an operating device for an illuminant comprising the features specified in the independent claims are specified according to the invention. The dependent claims define advantageous and preferred embodiments of the invention.

In methods and devices according to exemplary embodiments, a power factor correction circuit for an illuminant can be operated in a plurality of operating modes. Depending on a load, which can be detected by means of the output power, for example, it is possible to select an operating mode from a plurality of operating modes. In a first operating mode, which can be a DCM operating mode, a minimum waiting time between the switching-off of the switching means and renewed switching-on of the switching means is determined. A switch-on instant for the switching means is defined not only depending on the minimum waiting time but also depending on a voltage dropped across the switching means. This makes it possible to take account of the dynamic behavior of the power factor correction circuit during the off state of the switching means for determining the switch-on instant. In a power factor correction circuit according to one exemplary embodiment, a control device is configured to implement the corresponding method.

The switching means can be a power switch, in particular a FET or MOSFET, and the voltage dropped across the switching means can be the drain-source voltage of the power switch while the power switch is switched into the off state.

The control device of the power factor correction circuit can define the switch-on instant depending on the time-dependent behavior of the voltage dropped across the drain-source path of the power switch. The control device of the power factor correction circuit can define time windows which correspond to permissible switch-on times and which are in each case at the times at which the voltage dropped across the drain-source path of the power switch approaches a local minimum or passes through the latter. In other words, the switch is switched on only if it is the case not just that the minimum waiting time has elapsed but that the voltage at the switching means is in a "valley". Such a procedure is also referred to as "valley switching".

The control device of the power factor correction circuit can obtain information about the voltage at the drain-source path of the switching means or the change thereof in various ways. In one configuration, the current flowing through the inductance of the power factor correction circuit can be detected and the instant at which the voltage at the drain-source path of the switching means has an extremum can be determined depending on a comparison of the current through the coil with a reference value. A corresponding measurement signal indicating the current in the coil or the zero crossings thereof can be fed to the control device. The measurement signal can be generated such that it indicates zero crossings of the coil current and the direction thereof. A local minimum or valley of the voltage at the switching means can be identified depending on a zero crossing of the coil current in a specific direction.

For detecting the zero crossing of the current, a corresponding detection circuit can be provided, with which, by means of a winding, for example, the coil current is detected and compared with a reference value.

The control device of the power factor correction circuit can perform a transition between the first operating mode and a second operating mode depending on the load or output power of the power factor correction circuit. The second operating mode can be CCM operation or BCM operation. In the second operating mode the power factor correction circuit can be controlled or regulated by means of the setting of the on time during which the switching means is switched on in each case. In the first operating mode the power factor correction circuit can be controlled or regulated by means of the setting of the minimum waiting time. In the first operating mode the on time during which the switching means is switched on in each case can be chosen to be equal to the value corresponding to the minimum value of the on times permissible in the second operating mode. The minimum waiting time can be defined and used only in the first operating mode for the control of the power factor correction circuit.

If the control device of the power factor correction circuit recognizes that the load or output power falls below a threshold value, the control device can automatically change from the second operating mode to the first operating mode.

The power factor correction circuit according to exemplary embodiments can be used in particular for power factor correction for an AC voltage/DC voltage converter, such that in this case the input voltage is a rectified AC voltage and the output voltage is a DC voltage. The power factor correction circuit according to exemplary embodiments can be constructed in accordance with the topology of a boost converter, such that the discharge current of the inductance is fed via a diode to the output terminal coupled to an output capacitance. The methods and configurations described are also applicable to other converter topologies.

In each of the exemplary embodiments, in the first operating mode, for example in the DCM operating mode, a switch-on instant can be chosen such that cumulatively the following three conditions are fulfilled: the minimum waiting time has elapsed; the current through the inductance is at a zero crossing; and the drain-source voltage of the switching means has fallen to a local minimum.

The control device can be configured in the form of an integrated circuit, in particular an Application Specific Integrated Circuit (ASIC). The control device can have a common measurement input for detecting a measurement variable which corresponds to the coil current or to a zero crossing of said current and which is also used for determining the time windows corresponding to a local minimum or the voltage dropped across the switching means.

Method and power factor correction circuit can be used in an operating device for an illuminant, for example for an electronic ballast for a fluorescent illuminant or for an LED converter. In this application exemplary embodiments of the invention make it possible that an adaptation over a wide range of different power levels or components of the operating device used in each case is possible and in this case energy-efficient switching is achieved even in a DCM operating mode.

BRIEF DESCRIPTION OF THE DRAWINGS

The invention is explained below on the basis of preferred embodiments with reference to the drawings.

DETAILED DESCRIPTION OF THE PREFERRED EMBODIMENTS

Figure 1:
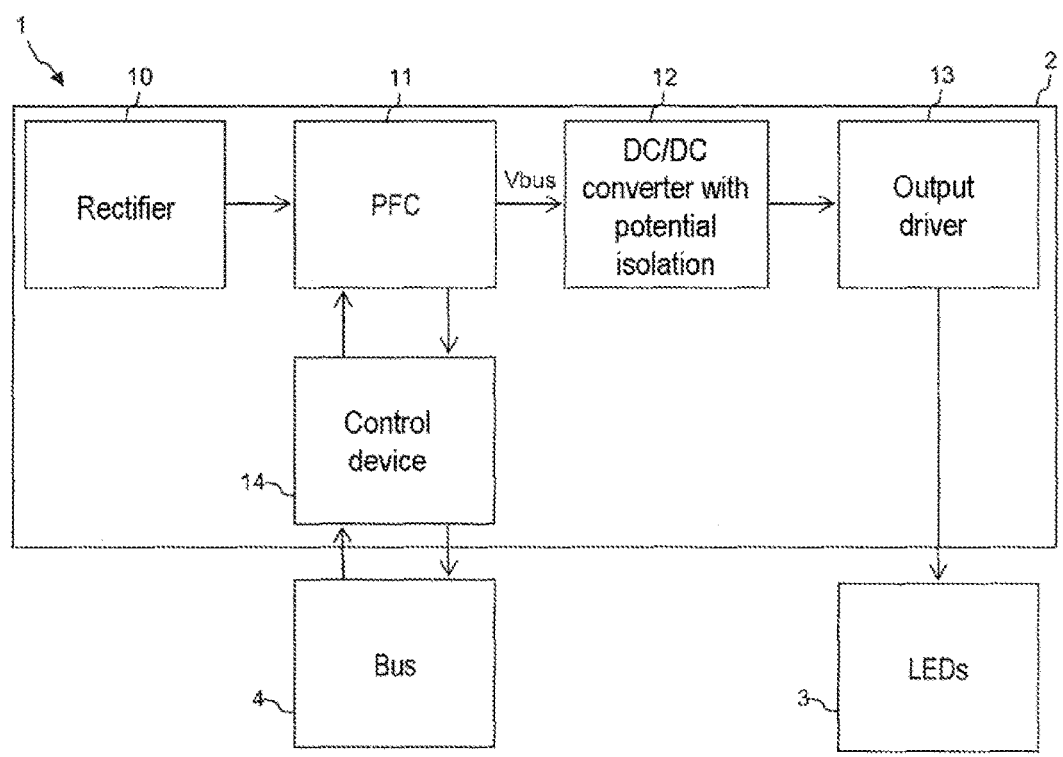
FIG. 1 shows a lighting system comprising a power factor correction circuit according to one exemplary embodiment.

FIG. 1 shows a block diagram illustration of a lighting system 1 comprising an operating device 2 for an illuminant 3, for example for LEDs. The operating device 2 can be connected to a bus 4 or a wireless communication system in order to receive dimming commands and/or to output status messages.

The operating device 2 can be configured for example as an electronic ballast (EB), for a gas discharge lamp, fluorescent lamp or some other fluorescent illuminant or as an LED converter. The operating device 2 has a rectifier 10 for rectifying a supply voltage, for example the power supply system voltage. The operating device 2 has a circuit for power factor correction 11 with an assigned control device 14. The power factor correction circuit provides an output voltage for components of the operating device 2 that are connected downstream, said output voltage also being designated as bus voltage Vbus. A further voltage conversion and/or dimming functions can be achieved for example by means of a DC/DC converter 12, which can be configured as an LLC resonance converter, and/or an output driver 13.

The functioning of the power factor correction circuit and of its control device 14 is described in greater detail with reference to FIGS. 2-10. Generally, the control device 14 can control the power factor correction circuit in a plurality of operating modes comprising at least one DCM ("Discontinuous Conduction Mode") operating mode as first operating mode and a second operating mode. The second operating mode can be selected from a CCM ("Continuous Conduction Mode") and a BCM ("Borderline Conduction Mode" or "Boundary Conduction Mode") operating mode. In the first operating mode an adaptation to a different load or different output power can be achieved by the setting of a minimum waiting time that has to elapse between the switching-off of a switching means and the renewed switching-on. In this case, the control device 14 controls the switching means such that not just the elapsing of the minimum waiting time influences the criterion for switching on the switching means, but in addition the time-dependent behavior of the power factor correction circuit is taken into account. The switching means can be switched on again depending on whether the minimum waiting time has elapsed and a drain-source voltage of the switching means fulfils a specific criterion. The criterion can include the fact that the drain-source voltage of the switching means attains a local minimum value as a function of time. This criterion can be checked by the control device 14 being fed a variable which includes information about zero crossings of the current in a coil of the power factor correction circuit.

Figure 2:
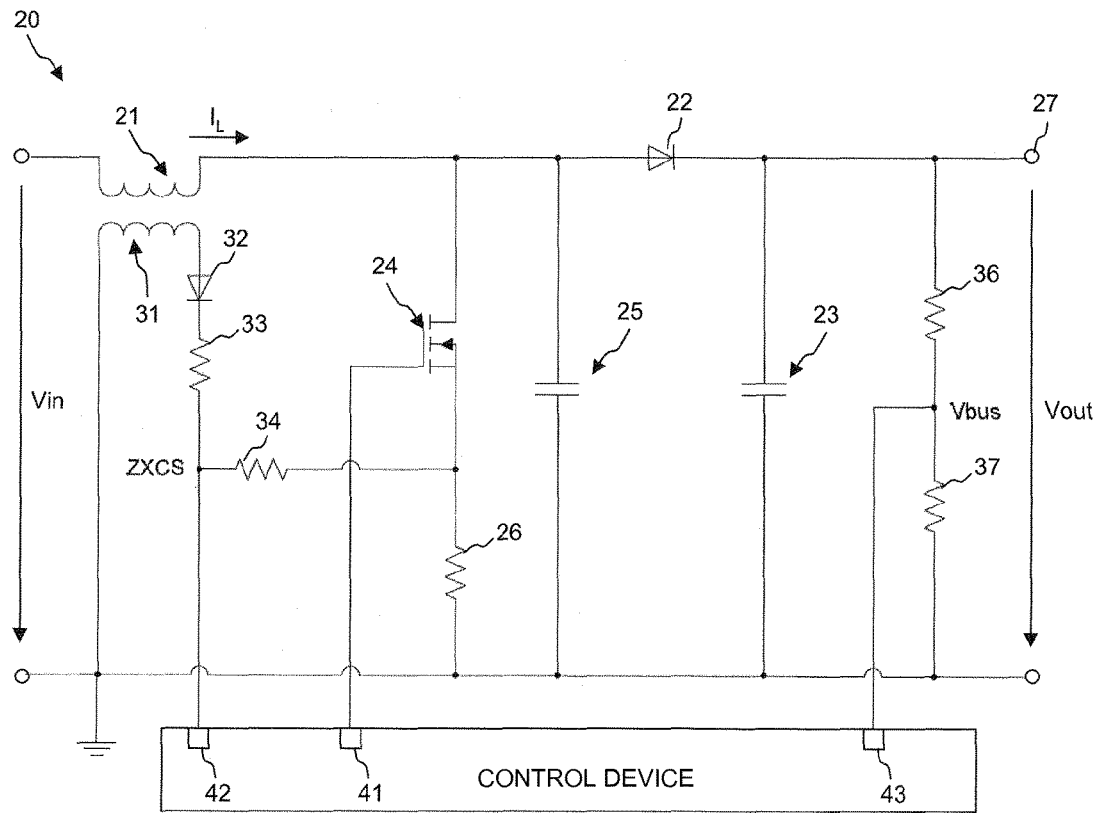
FIG. 2 shows a circuit diagram of a power factor correction circuit according to one exemplary embodiment.

FIG. 2 is a circuit diagram of the power factor correction circuit 20 according to one exemplary embodiment. A supply DC voltage, for example the power supply system voltage, is converted by a rectifier (not illustrated in FIG. 2) into a rectified AC voltage, which is present as input AC voltage Vin between an input terminal of the power factor correction circuit 20 and ground. The input AC voltage Vin is fed to an inductance or coil 21. The inductance 21 is connected in series with a diode 22 between the input terminal and an output terminal 27 of the power factor correction circuit 20. An output DC voltage Vout is provided at the output terminal 27, which is coupled to a charging capacitor 23. A further capacitor 25 can be connected between the inductance 21 and ground, said further capacitor being connected in parallel with a series circuit comprising a switch 24 and resistor 26. The capacitor 25 can be connected to the same terminal of the diode 22 to which the inductance 21 is connected as well.

The output DC voltage Vout serves for supplying a load upstream of which the power factor correction circuit 20 is connected. The load can be for example components of an operating device for an illuminant such as, for example, a fluorescent lamp, a halogen lamp, a light emitting diode arrangement, etc. The load can comprise an LLC resonance converter with potential isolation.

A controllable electronic switch 24, which is a power switch and which can be embodied for example as a field effect transistor (FET), in particular as a MOSFET, is connected to the connection between the inductance 21 and the diode 22. The switch 24 can be connected to ground via a resistor 26, wherein the resistor 26 can serve as a shunt resistor. The switch 24 is switched into the on state and the off state by the control device 14 of the power factor correction circuit 20. The control device 14 has a corresponding output 41 for modulating a control signal with which, for example, the gate voltage of the switch 24 can be controlled.

In the switched-on state of the switch 24, the inductance 21 is connected to ground via the switch 24, the diode 8 being in the off state, such that the inductance 21 is charged and energy is stored in the inductance 21. By contrast, if the switch 24 is switched off, i.e. open, the diode 22 is in the on state, such that the inductance 21 can be discharged into the charging capacitor 23 via the diode 22 and the energy stored in the inductance 21 is transferred into the charging capacitor 23.

The switch 24 is driven by a control device 14, which can be configured in the form of an integrated circuit, in particular as an ASIC. The power factor correction is achieved by the switch 24 being repeatedly switched on and off, wherein the switching frequency for the switch 24 is much greater than the frequency of the rectified input AC voltage Vin. The power factor correction circuit 20 can operate as a boost converter.

Various measurement variables can be fed to the control device 14, which measurement variables can be evaluated for controlling or regulating the power factor correction circuit 20 or other components of the operating device. By way of example, the control device 14 can detect the output voltage by means of a voltage divider comprising resistors 36, 37.

The control device 14 can also be fed a measurement variable which indicates when a current $I_L$ in the inductance 21 has a zero crossing or the sign with which the zero crossing takes place. The corresponding detection circuit can have a winding 31 or small coil 31, which is inductively coupled to the inductance 21. The winding 31 is connected to a node via a diode 32 and a resistor 33, which node is connected via a further resistor 34 to a node between the switch 24 and the resistor 26. The signal at the input 42 of the control device 14 indicates zero crossings of the current $I_L$ in the inductance 21 in particular in the time periods in which the switch 24 is switched into the off state.

The control device 14 generates a control signal in order to switch the switch 24 into the on state or the off state. This can be done in various ways, in particular depending on a load or output power. In the case of relatively high loads or output powers, a second operating mode is used, which can be BCM operation or CCM operation. The time duration during which the switch 24 is switched on in each case can be set here in order to keep the output voltage at a desired value. The time duration during which the switch 24 is switched on in each case can be chosen depending on a load or output power at the output 27. As long as the load or output power is greater than a threshold value, an adaptation of operation can be performed by reduction of the on time, i.e. time duration during which the switch 24 is switched on in each case. If the load or output power attains the threshold value, a first operating mode can be activated, which is DCM operation. In this case, after the switch 24 has been switched into the off state, the switch 24 is not immediately switched on again if the current $I_L$ in the inductance 21 has fallen to zero, rather a specific minimum waiting time is provided. In DCM operation, the on time can be kept at a predefined fixed value, which can be the smallest value that can be chosen for the on time in BCM operation. An adaptation to different loads or output powers can be carried out in the first operating mode, i.e. in DCM operation, through adaptation of the minimum waiting time.

As described in even greater detail with reference to FIGS. 4, 5, 7 and 8, in the first operating mode, i.e. in DCM operation, a switch-on instant for the switch is defined not only in accordance with the minimum waiting time, but also depending on the time-dependent behavior of the current $I_L$ through the inductance 21 and depending on the time-dependent behavior of the voltage dropped between drain terminal and source terminal of the switch 24.

Figure 3:
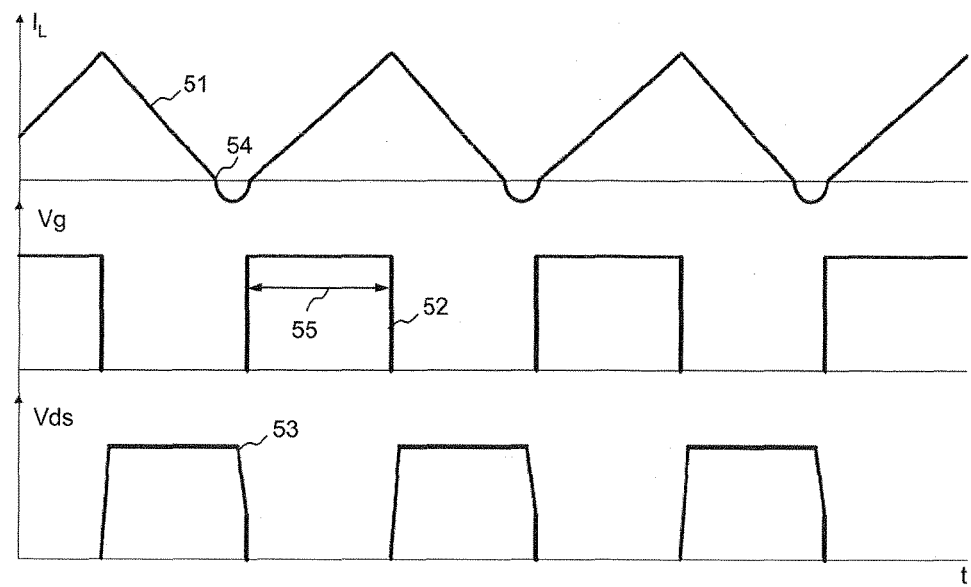
FIG. 3 shows currents and voltages for explaining the functioning of the power factor correction circuit according to one exemplary embodiment in a second operating mode, which can be BCM operation.

FIG. 3 illustrates the control of the power factor correction circuit 20 by the control device 14 in the second operating mode, which is illustrated by way of example as BCM operation. The switch is switched into the on state and into the off state by means of the gate voltage Vg at the switch 24. If the switch is switched into the off state, the inductance 21 is discharged and the coil current 51 decreases. In BCM operation, a new switch-on process can be initiated as a result of the current 51 falling to zero or having a zero crossing at 54. The switch 24 is then switched on again by means of the corresponding control signal 52 in order to charge the inductance 21 anew. In BCM operation, the on time 55 can be adapted in order to keep the bus voltage stable for different loads and/or output powers. FIG. 3 likewise illustrates the voltage 53 dropped between drain terminal and source terminal of the switch 24 in BCM operation.

While BCM operation is illustrated by way of example in FIG. 3, the second operating mode, which can be activated in the case of relatively high loads and/or relatively high output powers, can also be CCM operation. In CCM operation, the switching-on of the switch 24 can be initiated if the current $I_L$ through the inductance 21 attains a reference value different than zero.

Figure 4:
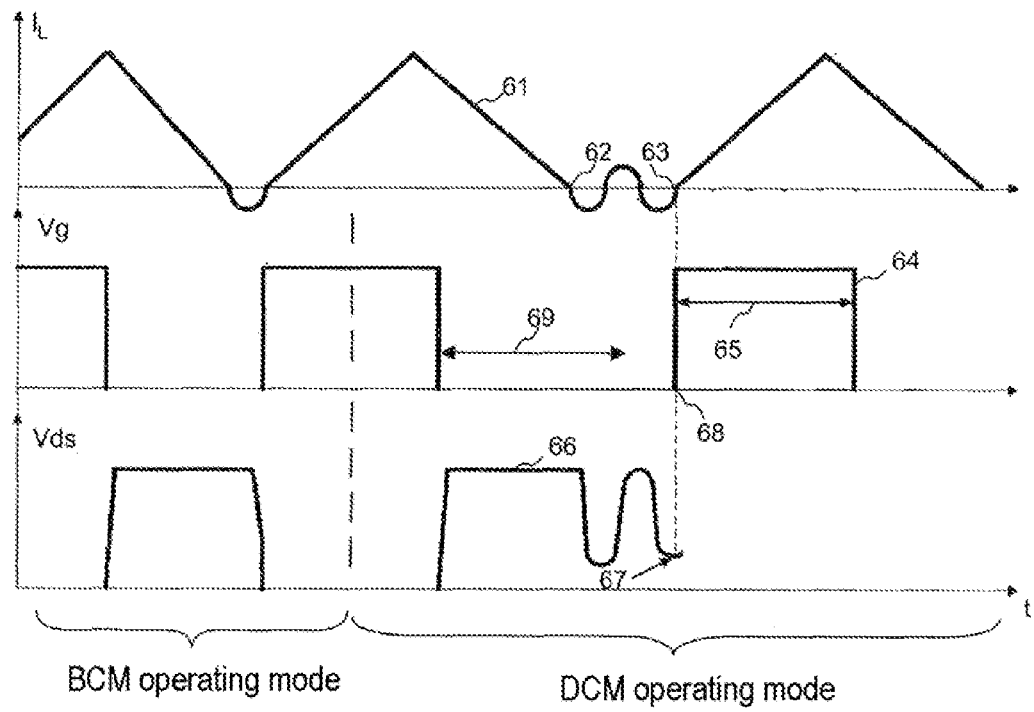
FIG. 4 shows currents and voltages for explaining the functioning of the power factor correction circuit according to one exemplary embodiment in a first operating mode, which is DCM operation.

FIG. 4 illustrates the transition from the second operating mode to the first operating mode, i.e. to DCM operation. By means of a suitable choice of the switch-on instant 68 at which the switch 24 is switched into the on state again, irregularities in the coil current $I_L$ can be reduced or eliminated and the dissipation in the switch 24 and thus the heating of the switch 24 can be kept reduced.

In the first operating mode, i.e. in DCM operation, the control device 14 can define a minimum waiting time 69 before the renewed switching of the switch 24 into the on state. The switch-on instant 68 at which the switch 24 is switched into the on state again does not necessarily coincide directly with the end of the minimum waiting time 69. The switch-on instant 68 is defined such that the minimum waiting time 69 has elapsed and additional criteria have been fulfilled which are dependent on the time-dependent behavior of the power factor correction circuit 20. The additional criteria used for defining the switch-on instant 68 can include the fact that the current 61 through the inductance has a zero crossing and the fact that the voltage 66 dropped between drain terminal and source terminal of the switch 24 in the first operating state attains a local minimum 67.

In the case of the power factor correction circuit 20 from FIG. 2, the presence of the criteria relating to the current 61 through the inductance 21 and the voltage 66 at the switch 24 can be checked on the basis of the signal at the input 42 of the control device. Said signal provides information about the presence of a zero crossing of the current 61 through the inductance 21 and the sign of the zero crossing, such that it is possible to ascertain whether the drain-source voltage at the switch 24 is presently at a local maximum or a local minimum.

Applying these criteria has the effect that after the switch has been switched off, the switch is not switched on again upon a first zero crossing 62 of the current 61. The inductance 21 and capacitance 25 of the power factor correction circuit 20 form a resonant circuit, such that after the decrease in the current 61, the coil current 61 exhibits oscillations as long as the switch 24 remains in the off state. In the example illustrated, the renewed switching of the switch 24 into the on state also does not take place upon the second zero crossing of the current 61, since the minimum waiting time 69 has not yet elapsed. In the example illustrated, the renewed switching of the switch 24 into the on state also does not take place upon the third zero crossing of the current 61, since, although the minimum waiting time 69 has elapsed, the direction of the zero crossing is such that it corresponds to a local maximum of the voltage at the switch. The switch-on instant 68 is determined by the zero crossing 63 at which the voltage dropped between drain terminal and source terminal of the switch 24 has a local minimum.

The criteria mentioned result in a number of effects being achieved. By setting the minimum waiting time 69, it is possible to carry out an adaptation to different loads and/or output powers even if an adaptation by further reduction of the on time 55 or 65 is no longer possible or is possible only with difficulties. Overshooting of a desired peak value for the current $I_L$ through the inductance 21 can be reduced, and the peak value of the current $I_L$ through the inductance 21 that is attained upon each occasion of the switch being switched on can be kept at a consistent desired value. By switching at the local minimum or valley of the voltage dropped between drain terminal and source terminal of the switch 24, it is possible to reduce the dissipation and thus the heating of the switch 24 in comparison with operation in which switching is always effected immediately when a fixed waiting time has elapsed.

Figure 5:
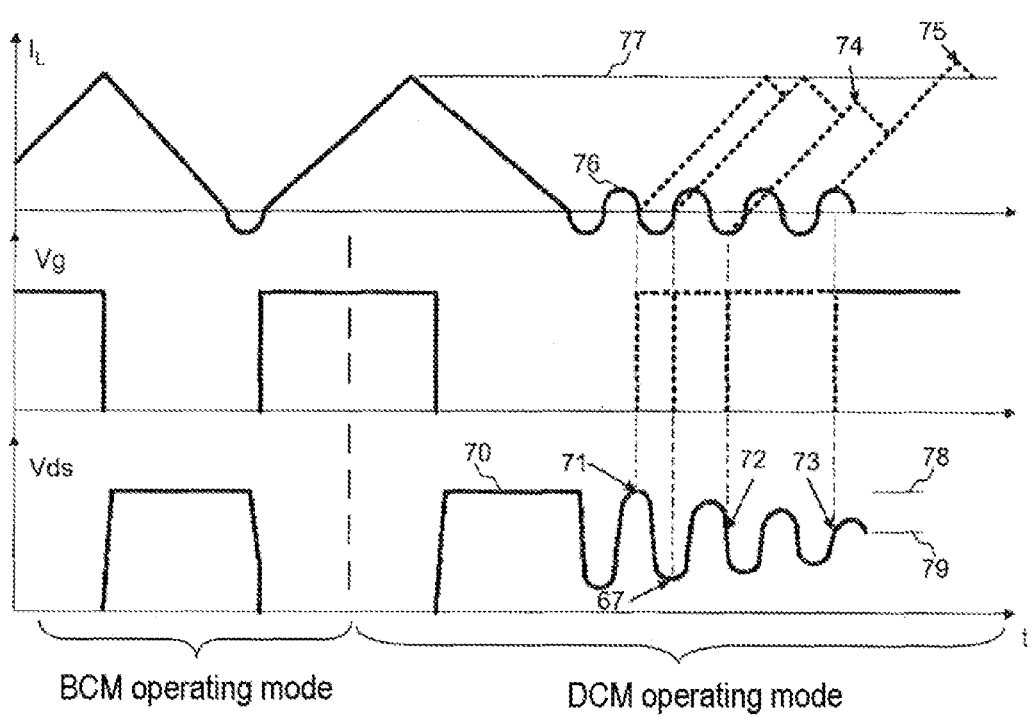
FIG. 5 shows currents and voltages for explaining the functioning of the power factor correction circuit according to one exemplary embodiment in the first operating mode.

FIG. 5 illustrates these effects. The inductance 21 and capacitance 25 of the power factor correction circuit 20 form a resonant circuit, such that after the switch has been switched off, the coil current 69 through the inductance 21 and the voltage 70 at the switch 24 exhibit oscillations having a phase shift with respect to one another.

If the switch 24 were switched on again at an instant at which the drain-source voltage 70 at the switch 24 is not an extremum and corresponds to the input voltage 79, for example, the current $I_L$ through the inductance 21, upon the switch being switched on, would have a value shifted by a specific value with respect to the zero line. Switching the switch 24 into the on state at this instant would lead, upon the subsequent charging of the inductance 21, to the result of a peak value 74 or a peak value 75 of the current $I_L$ which does not attain or overshoots a desired value 77 for the peak current.

If the switch 24 were switched on again at an instant at which the drain-source voltage 70 at the switch 24 has a local maximum 71 at which the voltage is equal to the bus voltage 78, for example, a consistent peak value of the current through the inductance 21 would still be attained. However, the local voltage maximum, upon the switch 24 being switched on, would lead to an increased dissipation and thus to increased heating.

What is achieved by the switching at the local minimum or "valley" 67 of the drain-source voltage 70 at the switch 24 is that the peak value of the current through the inductance attains the desired value 77 and the dissipation during switching remains smaller than during switching at one of the points 71-73.

Figure 6:
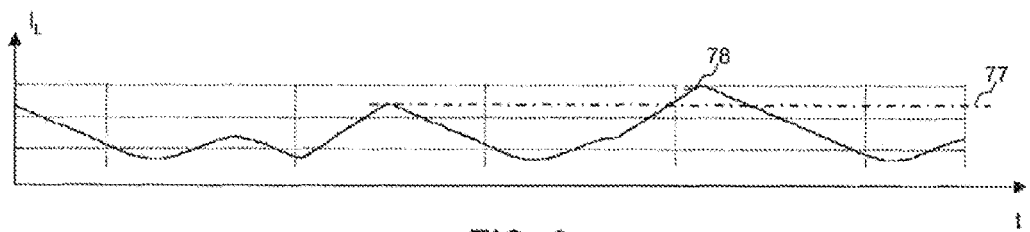
FIG. 6 schematically shows a current through a coil if a switching means is switched on again directly after a fixed waiting time has elapsed.

For further elucidation of the effects of the power factor correction circuit, FIG. 6 illustrates for comparison the current $I_L$ through the inductance which would result if, for example, after a change in the waiting time in DCM operation independently of the time-dependent behavior of the power factor correction circuit, the switch were immediately switched into the on state again at the end of the waiting time. In the case illustrated, the current exhibits a peak value 75 that exceeds a desired value 77. Such an irregular behavior of the current can be reduced or prevented in exemplary embodiments in which criteria for the switch-on instant which depend on the dynamic behavior of the power factor correction circuit 20 are also taken into account in addition to the minimum waiting time.

In the case of the power factor correction circuit 20, at the input 42 of the control device a signal is provided which gives information about whether the current $I_L$ through the coil has a zero crossing and whether the drain-source voltage at the switch 24 presently has a local maximum or a local minimum or valley. This signal is evaluated by the control device 14. The control device 14 can generate time windows for switching-on the switch 24 depending on the signal at the input 42. The control device 42 can logically combine said time windows with a check as to whether the minimum waiting time 69 has already elapsed, in order to ascertain when the switch 24 is to be switched into the on state. The time windows can be generated in each case such that they are initiated by a zero crossing of the current $I_L$ in a specific direction. The duration of the time windows can have a predefined value. The latter can be equal, for example, to a minimum on time of the switch 24 that can be set in the second operating mode.

Figure 7:
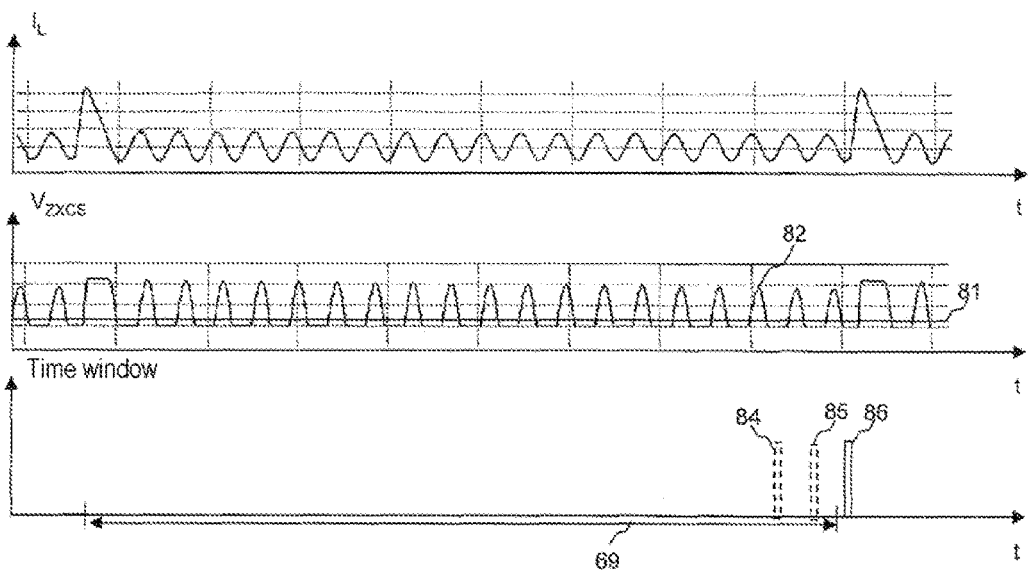
FIG. 7 illustrates the functioning of the power factor correction circuit according to one exemplary embodiment in the first operating mode.
Figure 8:
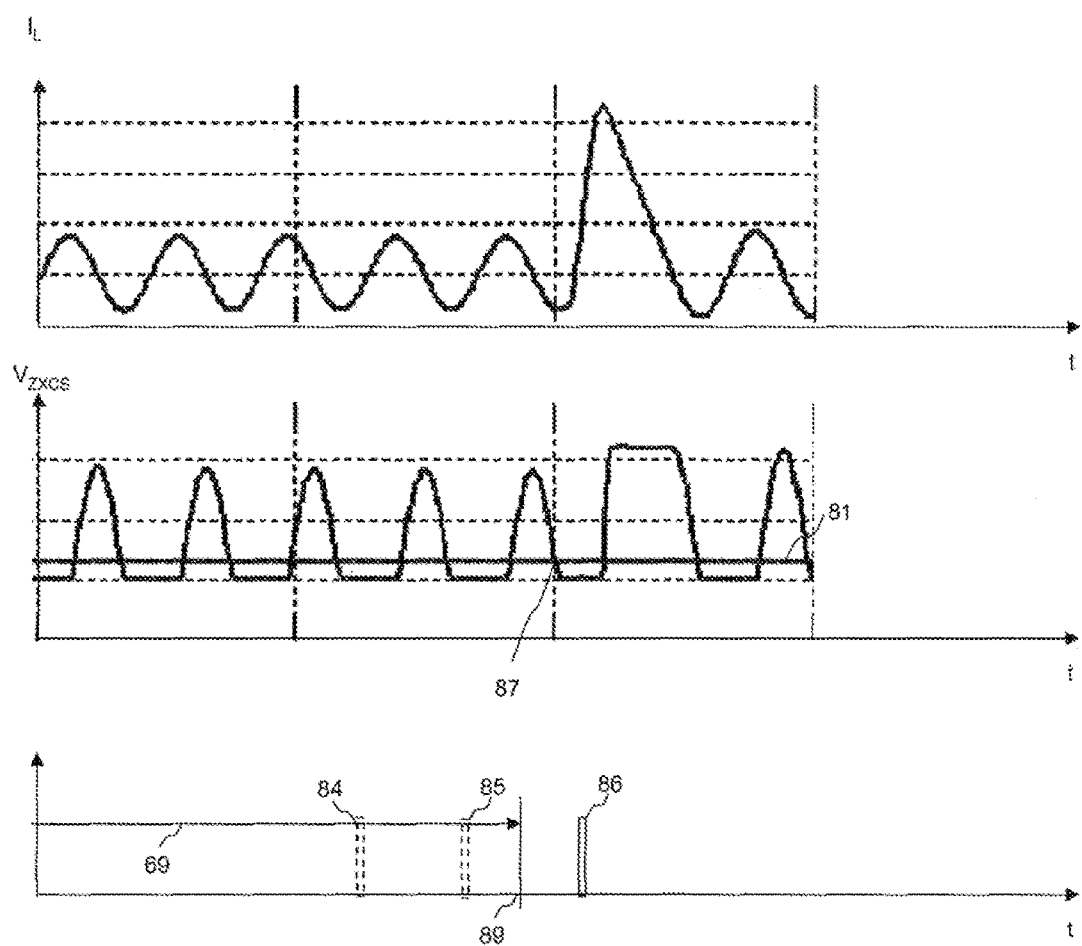
FIG. 8 illustrates the functioning of the power factor correction circuit according to one exemplary embodiment in the first operating mode.

FIG. 7 and FIG. 8 illustrate the determination of the instant at which the switch is switched into the on state again in the first operating mode. While the switch 24 is in the off state, the current $I_L$ through the inductance 21 effects oscillations about a zero line that are caused by the resonance circuit formed from inductance 21 and capacitance 25. These oscillations are correspondingly discernible in the signal 82 at the input 42 of the control device 14. Instances at which the current $I_L$ through the inductance 21 has a zero crossing in each case are discernible by comparing the signal 82 with a reference value 81. The control device 14 can comprise a comparator, for example, to which the signal 82 and the reference value 81 are fed on the input side. Jumps in the output signal of the comparator indicate instant and direction of the zero crossing of the current $I_L$ through the inductance 21.

On the basis of the identified zero crossings of the current $I_L$ through the inductance 21 which have a sign change in a predefined direction, time windows are generated in each case, of which only time windows 84-86 are illustrated. These time windows correspond to the times at which, on the basis of the time-dependent behavior of the current through the inductance 21 and the drain-source voltage at the switch 24, the switch 24 should be switched on. These time windows are chosen depending on the fact that the drain-source voltage at the switch 24 is in any case close to a local minimum and the fact that the current through the inductance 21 is in any case in the vicinity of a zero crossing.

An additional criterion taken into account is that the minimum waiting time 69 must have elapsed. Since the time windows 84, 85 precede an end 89 of the minimum waiting time 69, the switch 24 is not yet switched into the on state anew. The switch 24 can be switched into the on state again, however, for example in the first time window 86 which succeeds the end 89 of the minimum waiting time. The switch-on instant is defined depending on whether the end 89 of the minimum waiting time has already elapsed, if the signal at the input 42 of the control device 14 attains the reference value 81 at an instant 87.

In the case of the power factor correction circuit and method according to exemplary embodiments, in the first operating mode the control device can adapt a waiting time such that it is at least equal to a predefined minimum waiting time and furthermore depends on the time-dependent drain-source voltage at the switch 24, which is detected by means of an input of the control device to which a signal indicating zero crossings of the coil current is fed.

Depending on whether the control device 14 operates in the first operating mode or in the second operating mode, the control device 14 can automatically implement different measures for controlling the behavior of the power factor correction circuit 20. Such an adaptation can be carried out, for example, in order to readjust the output voltage Vout to a desired value. An adaptation can also be carried out in order, depending on the load or output power, to adapt the control of the power factor correction circuit 20 such that harmonics are suppressed well. If a load-based adaptation is carried out, the control device 14 can identify the load for example on the basis of a ripple, i.e. on the basis of the voltage ripples of the output voltage Vout. For this purpose, the output voltage Vout can be detected and fed to the control device 14.

a. The second operating mode, which can correspond to BCM operation or CCM operation, for example, can be activated in the case of loads or output powers greater than a threshold value. In BCM operation or CCM operation, an adaptation to different loads or different output powers can be carried out by means of the on time of the switch, i.e. the time duration during which the switch 24 is switched into the on state in each case. For a smaller load or smaller output power, the on time can be correspondingly reduced until it attains a permissible minimum value. If a further reduction of the on time is no longer possible, a transition to DCM operation can take place.

In the first operating mode, for example in DCM operation, the on time can be kept at a fixed value. The latter can correspond to the permissible minimum value for the on time which can be set in the second operating mode. In the first operating mode, it is possible to carry out an adaptation of the operation of the power factor correction circuit by changing the minimum waiting time.

Figure 9:
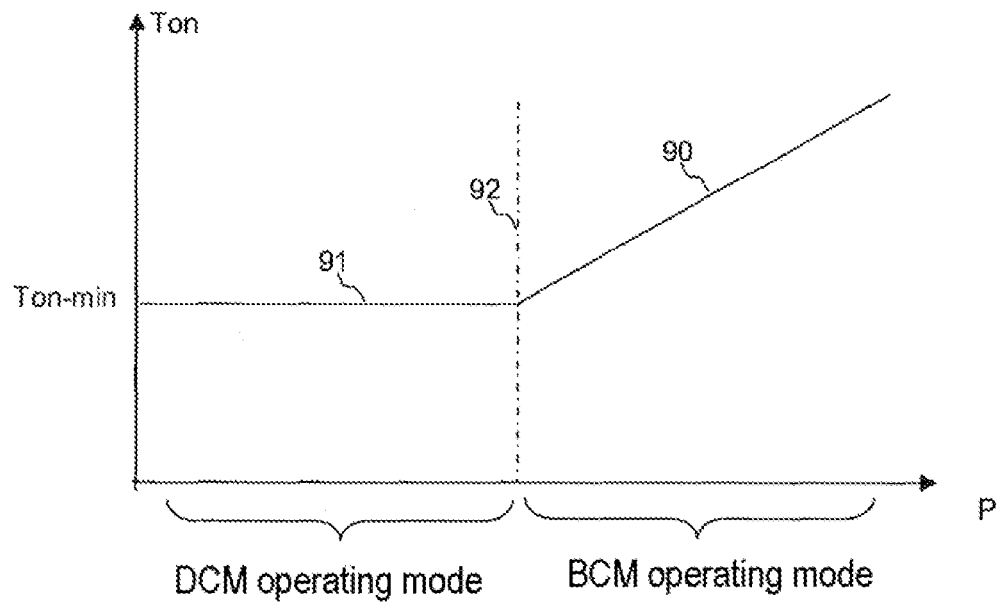
FIG. 9 and FIG. 10 illustrate a parameter adaptation by a control device of the power factor correction circuit according to one exemplary embodiment.
Figure 10:
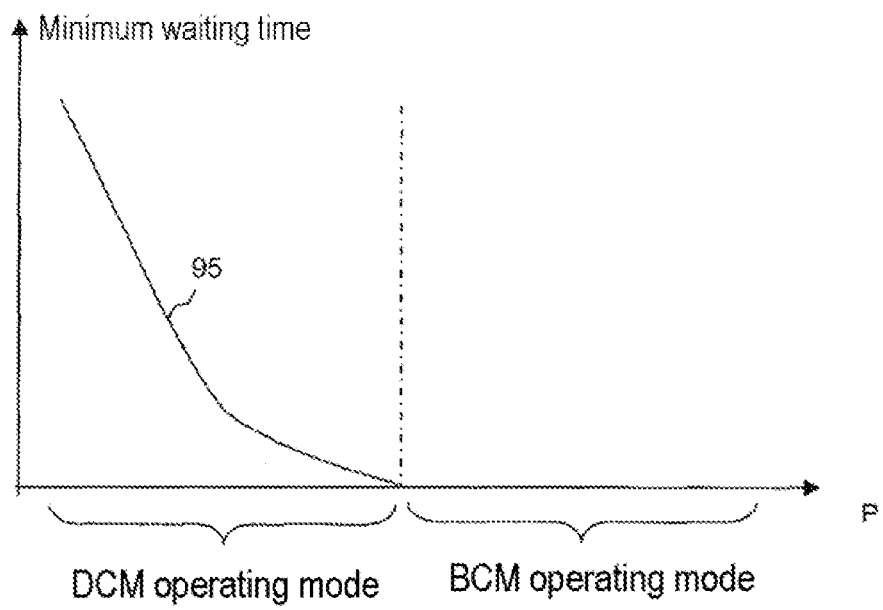

FIG. 9 and FIG. 10 illustrate the adaptation of the operation of the power factor correction circuit by changing parameters that influence the driving of the switch 24. The adaptation can be carried out for example as a function of the output power of the power factor correction circuit or load.

FIG. 9 shows the on time of the switch, i.e. the time duration during which the switch 24 is switched into the on state in each case. If the output power is decreased proceeding from a higher value at which the power factor correction circuit is operated in the BCM or CCM operating mode, this corresponds to a corresponding reduction of the on time of the switch to a permissible minimum value. In the event of a further reduction of the power, the transition to the DCM operating mode can take place. In this case, the on time can be kept at a constant value 91 corresponding to the minimum value for the on time that can be set by the control device for the second operating mode. A load-dependent setting of the minimum waiting time can be carried out in the second operating mode. FIG. 10 shows by way of example the profile of a characteristic curve which can be used for adapting the minimum waiting time in DCM operation. The characteristic curves as illustrated in FIG. 9 and FIG. 10 can be stored in the form of a corresponding table in the control device 14 for example in the case of a digital configuration of the control device 14.

While exemplary embodiments have been described with reference to the figures, modifications can be realized in further exemplary embodiments. While a transition from BCM operation to DCM operation has been described, for example, in further exemplary embodiments the control device can be configured for driving in the CCM operating mode. A load-dependent transition from CCM operation to DCM operation can correspondingly take place.

While a description has been given of exemplary embodiments in which the current through the inductance is detected inductively using a coil or winding, other circuits can be provided in order to identify zero crossings of the current and/or local extrema of the drain-source voltage of the controllable switch. While a description has been given of exemplary embodiments in which a local minimum or valley of the drain-source voltage of the controllable switch is detected on the basis of an input signal of the control device which indicates zero crossings of the current in the inductance, it is also possible to use other arrangements that allow the control device to identify a local extremum of the drain-source voltage of the controllable switch.

Methods and devices according to exemplary embodiments can be used in operating devices for illuminants, for example in an electronic ballast or in an LED converter.

What is claimed is:

1. A method for controlling a power factor correction circuit, the power factor correction circuit having an inductance coupled to an input, and a switch coupled to the inductance, to controllably charge and to controllably discharge the inductance by closing and opening the switch, wherein the method comprises:
controlling the switch in accordance with a selected operating mode from a plurality of operating modes, wherein in a first operating mode the switch is switched on only:
after a non-zero minimum waiting time following a switching-off of the switch has elapsed, and when a local minimum voltage across the switch is detected after the non-zero minimum waiting time, wherein the non-zero minimum waiting time extends beyond a time at which at least one local minimum voltage across the switch occurs after the switching-off of the switch.

2. The method of claim 1, wherein in the first operating mode a switch-on instant is defined depending on a temporal profile of the voltage across the switch.

3. The method of claim 1, further comprising determining, in the first operating mode, at least one time window for switching on the switch based on an instant at which the voltage across the switch has a local extremum.

4. The method of claim 3, further comprising determining whether the voltage across the switch has the local extremum based on a comparison of a reference value with an indication of a current flowing through the inductance or based on a zero crossing of the current flowing through the inductance.

5. The method of claim 4, wherein the determining the at least time window is based on an instant at which a difference between the indication and the reference value has a change of sign in a predefined direction.

6. The method of claim 4, wherein the reference value is chosen such that it indicates a zero crossing of the current flowing through the inductance.

7. The method of claim 3, wherein the local extremum is the local minimum voltage.

8. The method of claim 1, further comprising determining the minimum waiting time based on a load at an output of the power factor correction circuit or based on an output power.

9. The method of claim 1, further comprising, in a second operating mode of the plurality of operating modes, switching on the switch independently of the minimum waiting time.

10. The method of claim 9, wherein the first operating mode of the plurality of operating modes is a discontinuous conduction mode (DCM) operating mode and the second operating mode of the plurality of operating modes is a continuous conduction mode (CCM) operating mode or a boundary conduction mode (BCM) operating mode.

11. The method of claim 1, wherein the first operating mode is only activated if a load or an output power is less than a threshold value.

12. The method of claim 1, further comprising measuring a current through the inductance using a secondary winding.

13. The method of claim 1, wherein the first operating mode is a discontinuous conduction mode (DCM) operating mode, and while operating in the DCM operating mode, a duration of time during which the switch is on is a constant value.

14. A power factor correction circuit comprising:
an inductance coupled to an input of the power factor correction circuit;
a switch coupled to the inductance; and
a control device configured to charge and to discharge the inductance by controlling the switch, wherein the control device is further configured to control the switch in accordance with a selected operating mode from a plurality of operating modes, wherein in a first operating mode the control device is configured to switch on the switch only:
after a non-zero minimum waiting time following a switching-off of the switch has elapsed, and a local minimum voltage across the switch is detected after the non-zero minimum waiting time, wherein the non-zero minimum waiting time extends beyond a time at which at least one local minimum voltage across the switch occurs after the switching-off of the switch.

15. The power factor correction circuit of claim 14, wherein the control device is further configured to, in the first operating mode, determine whether the voltage across the switch is the local minimum voltage based on a comparison of a reference value with an indication of a current flowing through the inductance or based on a zero crossing of the current flowing through the inductance.

16. The power factor correction circuit of claim 15, wherein the control device is further configured to determine, in the first operating mode, at least one time window for switching on the switch based on the local minimum voltage.

17. The power factor correction circuit of claim 15, wherein the reference value is chosen such that it indicates a zero crossing of the current flowing through the inductance.

18. The power factor correction circuit of claim 14, wherein the control device is further configured to determine the minimum waiting time based on a load at an output of the power factor correction circuit or based on an output power.

19. The power factor correction circuit of claim 14, wherein the first operating mode of the plurality of operating modes is a discontinuous conduction mode (DCM) operating mode and a second operating mode of the plurality of operating modes is a continuous conduction mode (CCM) operating mode or a boundary conduction mode (BCM) operating mode, and while operating in the DCM operating mode, a duration of time during which the switch is on is a constant value.

20. The power factor correction circuit of claim 14 further comprising a secondary winding, wherein a current through the inductance is measured using the secondary winding.

* * * * *